Sept. 23, 1969   J. C. ELGIN   3,468,974
MOLDING COMPOSITIONS CONTAINING NYLON AND RUBBER
FROM SCRAP TIRE CORD MATERIAL
Filed March 21, 1966
FIG. 1
PELLETING TIRE CORD
CONTAINING THERMO-
PLASTIC AND ELASTO-
MERIC MATERIAL.
FIG. 3
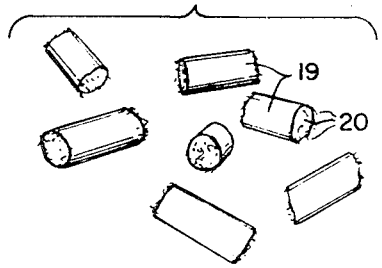
FIG. 2
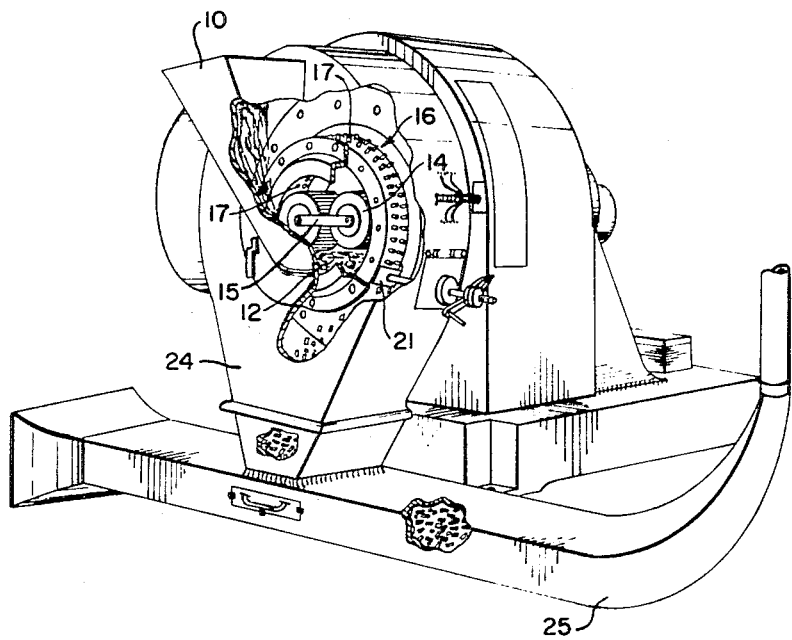
INVENTOR.
JOSEPH C. ELGIN
BY Robert Irving Williams
ATTORNEY

United States Patent Office 3,468,974
Patented Sept. 23, 1969

3,468,974
MOLDING COMPOSITIONS CONTAINING NYLON AND RUBBER FROM SCRAP TIRE CORD MATERIAL
Joseph C. Elgin, Princeton, N.J., assignor to U.S. Rubber Reclaiming Co., Inc., Vicksburg, Miss., a corporation of New York
Filed Mar. 21, 1966, Ser. No. 535,775
Int. Cl. C08g 41/04
U.S. Cl. 260—857                     2 Claims

ABSTRACT OF THE DISCLOSURE

A molding composition which contains from 64 to 91% of linear polyamide material and from 3 to 36% of vulcanized rubbery hydrocarbon elastomeric material is provided by extrusion pelletizing tire cord material from which a major portion of elastomeric material has been removed.

---

The molding art has been engaged for many years in a search for a molding composition yielding molded materials which have improved qualities, and which are at the same time capable of being handled and molded with ease and efficiency and of being produced readily and economically; that, intensive as this search has been, the need for a material which satisfactorily meets the practical requirements of a variety of situations has remained. Pursuant to the invention, however, a multipurpose molding material having highly desirable characteristics may be provided by the utilization of widely available materials or their equivalents.

The present invention contemplates in various of its aspects, the pelleting or otherwise compacting of tire cord containing a major proportion of nylon and/or other thermoplastic material and a minor proportion of rubber and/or other vulcanized elastomeric material used in vehicle tires; the provision of a compacted (e.g. an extrusion-pelleted) mixture of nylon (e.g. nylon 6-6) and/or other thermoplastic material and, in minor proportion, sulfur-vulcanized rubber and/or other elastomeric material of vehicle tires, and, in certain instances non-thermoplastic fibers, such, for example, as cotton also in a minor amount; and the formation of pellets in the absence of binder material.

In accordance with the invention there may be provided pellets of nylon recovered from used tire cord, which pellets are injection-moldable and/or extrudable, and which when molded or extruded have good tensile strength, good impact strength, high stiffness both as formed and after being exposed to moisture, high heat distortion temperature, good resistance to heat aging, good resistance to impact at low temperatures, low susceptibility to moisture, and/or good ozone resistance. Discrete particles of compacted nylon tire cord formed by extrusion or other processes may be provided in certain instances.

Distinct characteristics of a product embodying the invention are a higher heat distortion temperature, better heat aging characteristics, less susceptibility to moisture, and better resistance to repeated indentation than virgin nylon.

Typical compositions comprise tire cord chopped to particles ¼" to ½" in length and containing theremoplastic material in an amount from about 64 to 91% (preferably about 76 to 86%) of the composition, and vulcanized natural or synthetic tire rubber in an amount of from 3 to 36% (preferably from 4 to 16%) of the composition. The thermoplastic material should be mainly nylon (e.g. nylon 6-6), but may, in addition, contain cellulose acetate, polyester, and/or other thermoplastic fibers. Best results are obtained when thermoplastic fibers other than nylon are not present in an amount over 8% of the composition. Again, non-thermoplastic fibers such as cotton, in an amount up to 10%—preferably from 3 to 10%—may be included. Other cured elastomeric materials may, of course, be employed instead of vulcanized rubber in certain instances.

Good results are obtained when the rubber present is in that amount which clings to the fiber (either because it has remained bound to the fiber or because it adheres thereto even though in discrete particle form).

For best results, all rubber particles of over 30-mesh size, should be removed before pelleting.

To prepare the composition for molding it may be pelleted—or in certain instances otherwise compacted and prepared in discrete particle form—preferably at temperatures ranging from 150° F. to 350° F.

In certain instances where a relatively low content of rubber or other elastomeric material (e.g. 4% to 16%) is desirable for the sake either of special qualities or of economy of processing, there may be added to the tire cord 25 to 100% (with respect to the tire cord) of a thermoplastic material (e.g. scrap nylon) prior to compacting.

The invention accordingly comprises the several steps and the relation and order to one or more of such steps with respect to each of the others, and compositions possessing the features, properties, and the relation of constituents, all of which are exemplified in this disclosure, and the scope of the application of which will be indicated in the claims.

For a fuller understanding of the nature and objects of the invention, reference should be had to the following detailed description taken in connection with the accompanying drawings, in which:

FIGURE 1 is a general indication of one type of process embodying the invention;

FIG. 2 is a perspective view, with certain of the parts cut away, of one type of apparatus whereby a process embodying the invention may be carried out; and FIG. 3 is a view of a pelleted form of molding composition embodying the invention.

A process embodying the invention may, for example, be carried out in apparatus such as exemplified in FIG. 2. Ingredients such as indicated above are introduced thru a hopper 10 to an internal chamber 12 in which a pair of rollers 14 are mounted on the ends of a stationary bracket for free rotation against the interior of a perforated annular die 16 which is rotated (clockwise in FIG. 2) about the chamber by suitable driving means (not shown) and with which the rollers are in frictional driving contact. The rotating die picks up the introduced material and directs it between itself and a roll, creating pressures sufficient to mix and compact the ingredients and to extrude the material thru perforations 17 in the die. Temperatures of 200 to 300° F. tend to be generated by this action. The pressure at each roller causes the compacted material to project to a certain extent beyond the exterior of the perforations 17, so that, after each revolution of the die, the material will project more or less than the width of the perforations. In many instances, the extent of this projection may be somewhat more than the width of the perforations, so that, by cutting the projecting portions off, there may be provided pellets as indicated at 19 in FIG. 3; but it will be appreciated that many factors, including the use to which the molding pellets are to be put, may determine the relationship between the extruding forces provided and the size of the perforations or other factors, so that there may be provided pellets of a length which is greater than, less than, or substantially equal to the lateral extent thereof. Advantageously, and as exemplified, the pellets contain thermoplastic fibers which remain as fibers, and visibly so—as indicated at 20—after the pelleting operation, though some fibers at the cylindrical edges of the particular pellets shown have frictionally been heated up sufficiently to lose their fibrous form and to provide smoother surfaces.

In the present apparatus a stationary knife 21 is provided to cut off the projections to form pellets of the compacted composition. The pellets thus cut are, in the present instance, collected at 24, and pneumatically conducted at 25 for packaging, shipment, or use.

The following specific examples will assist in the understanding of the invention:

Example 1

Bales of nylon tire-cord remaining after removal of rubber from tires for a rubber reclaiming operation were analyzed and found to contain 12.8% rubber, 5.9% cellulose and 80.8% nylon (dry basis). The nylon from these bales was chopped and then pelleted in a pelleting machine (as above) at 275° F. giving dense pellets of the following analysis: 12.8% rubber, 6.5% cellulose, and 80.5% nylon (dry basis).

The pellets were injection molded, using a Van Dorn ram type 2 oz. machine, at 500° F. cylinder temperature, and 200° F. mold temperature. The pieces were ASTM tensile and impact bars. The molding cycles were 30 seconds for the tensile bar (⅛" thickness) and 60 seconds for the impact bar (½" thickness). The tensile strength was 6,287 p.s.i. (pounds per square inch). After aging 21 days at 250° F., the tensile was 5,480 p.s.i. and the elongation 1%.

The Izod impact, as molded, was 0.57 ft. lb. per inch of notch. After 21 days' aging at 250° F. the Izod impact was 0.5 ft. lb. per inch of notch.

The stiffness was 303,000 p.s.i. in the as molded condition and 123,000 p.s.i. at 2½% moisture.

The heat distortion temperature was 221° F. at 264 p.s.i. fiber stress, and 415° F. at 66 p.s.i. fiber stress.

Example 2

Pellets made as in Example 1 and of the following composition: rubber 28.7%, cellulose 6.4% and nylon 64.6% (dry basis), were molded in a higher clamping pressure ram type injection molding machine 15 second cycle for the tensile bars (⅛" thick) and 32 second cycle for the impact bars (½" thick). The temperatures were 530° F. front, 550° F. rear, 550° F. nozzle, and the die temperature was 150° F. The formed pieces had a specific gravity of 1.153 and a Shore D hardness of 71. The heat distortion temperature was 192° F. at 264 p.s.i. fiber stress, and 408° F. at 66 p.s.i. After aging 28 days at 250° F. the tensile was 2862 p.s.i.

The Izod impact, as molded, was 0.34 ft. lb. per inch of notch. After aging for 28 days at 250° F. the Izod impact was 0.36 ft. lb./in. of notch.

The stiffness was 230,000 p.s.i. in the as molded condition.

Example 3

Pellets of the following analysis: rubber 13.3%, cellulose 6.0%, and nylon 80.5% (dry basis), were prepared from bales of nylon tire cord remaining after removal of rubber from tires for a rubber reclaiming operation by chopping the fibers to ¼ to ½" size and passing thru a pellet mill (as above) operating at 275° F. and a rate of 500 lbs. per hour. The pellets were discharged at 190 to 200° F. and cooled to room temperature. The pellet density was 1.098 and the bulk density was 32.7 lbs./cu. ft.

For the purpose of testing, the pellets were injection molded in the machine of Example 2 under the following conditions: temperature 530° F. front, 550 °F. rear, 550° F. nozzle, and 150° F. die; the cycle was 32 seconds for the impact bar, and 15 seconds for the tensile bar. The molded piece had a specific gravity of 1.165, and a Shore D hardness of 78. The heat distortion temperature was 405° F. at 66 p.s.i. fiber stress, and 212° F. at 264 p.s.i. fiber stress.

The stiffness was 317,000 p.s.i. at 0% moisture and 119,000 p.s.i. at 3.1% moisture. The tensile strength (as molded) was 6,413 p.s.i. After aging 28 days at 250° F. the tensile strength was 3,370 p.s.i. The Izod impact (as molded) was 0.36 ft. lb. per inch of notch, after aging 28 days at 250° F. the impact was 0.39 ft. lb. per inch of notch. At 2.5% moisture (conditioned) the tensile strength was 5,225 p.s.i. The Izod impact at 2.5% moisture was 0.46 ft. lb. per inch of notch.

Example 4

Bales of nylon tire cord remaining after removal of rubber from tires for a rubber reclaiming operation were analyzed and found to contain 27.3% rubber, 7.1% cellulose, and 64.8% nylon (dry basis). The nylon from these bales was chopped and then pelleted in a pelleting machine (as above) at 275° F., giving dense pellets of the following analysis: 12.7% rubber, 3.8% cellulose, and 83.3% nylon (dry basis).

For the purpose of testing, the pellets were injection molded in the machine of Example 2, under the following conditions: Temperature 530° F. front, 550° F. rear, 550° F. nozzle, and 150° F. die; the cycle was 32 seconds for the impact bar, and 15 seconds for the tensile bar. The molded piece had a specific gravity of 1.163 and a Short D hardness of 78. The heat distortion temperature was 403° F. at 66 p.s.i. fiber stress, and 198° F. at 264 p.s.i. fiber stress.

The stiffness was 277,000 p.s.i. at 0% moisture and 107,000 p.s.i. at 3.0% moisture. The tensile strength (as molded) was 5,917 p.s.i. After aging 28 days at 250° F. the tensile strength was 2,970 p.s.i. The Izod impact (as molded) was 0.34 ft. lb. per inch of notch, after aging 28 days at 250° F. the impact was 0.30 ft. lb. per inch of notch. At 2.5% moisture (conditioned) the tensile strength was 4,182 p.s.i. The Izod impact at 2.5% moisture was 0.33 ft. lb. per inch of notch.

Example 5

Bales of nylon tire cord remaining after removal of rubber from tires for a rubber reclaiming operation were analyzed and found to contain 13.4% rubber, 5.5% cellulose, and 81.0% nylon (dry basis). The nylon from these bales was chopped and then pelleted in a pelleting machine (as above) at 275° F., giving dense pellets of the following analysis: 10.7% rubber, 4.5% cellulose, and 84.6% nylon (dry basis).

For the purpose of testing, the pellets were injection molded in the machine of Example 2 under the following conditions: Temperature 530° F. front, 550° F. rear, 550° F. nozzle, and 150° F. die. The cycle was 32 seconds for the impact bars, and 15 seconds for the tensile bar. The molded piece had a specific gravity of 1.160 and a Shore D hardness of 79. The heat distortion temperature was 431° F. at 66 p.s.i. fiber stress, and 205° F. at 264 p.s.i. fiber stress.

The stiffness was 313,000 p.s.i. at 0% moisture, and 112,000 p.s.i. at 3.1% moisture. The tensile strength (as molded) was 7,333 p.s.i. After aging 28 days at 250° F., the tensile strength was 3,900 p.s.i. The Izod impact (as molded) was 0.47 ft. lb. per inch of notch, after aging 28 days at 250° F. the impact was 0.43 ft. lb. per inch of notch. At 2.5% moisture (conditioned) the tensile strength was 5,805 p.s.i. The Izod impact at 2.5% moisture was 0.48 ft. lb. per inch of notch.

Example 6

Pellets of 10.5% rubber, 3.7% cellulose, and 85.6% nylon (dry basis) were prepared from bales of nylon tire cord, remaining after removal of rubber for a rubber reclaiming operation, by chopping the fibers moving thru a rotary cutter with ⅜₆" round holes in the screens, and passing the cut fibers thru a pellet mill (as above) at approximately 500 pounds per hour which developed an operating temperature of about 275° F. The pellets were discharged at 190 to 200° F., and cooled to room temperature. The pellet density was 1.100 and the bulk density was 32.0 lbs. per cu. ft.

The test bars were injection molded with the machine of Example 2 set at 530° F. front, 550° F. rear, 550° F. nozzle, and 150° F. die; the cycle was 32 seconds for the impact bar, and 15 seconds for the tensile bar. The molded piece had a specific gravity of 1.154, and a Shore D hardness of 80. The heat distortion temperature was 430° F. at 66 p.s.i. fiber stress, and 210° F. at 264 p.s.i. fiber stress.

The stiffness was 294,000 p.s.i. at 0% moisture, and 105,000 p.s.i. at 3.1% moisture. The tensile strength (as molded) was 7,443 p.s.i. The Izod impact (as molded) was 0.061 ft. lb. per inch of notch. After aging 28 days at 250° F., the tensile strength was 4,190 p.s.i., and the Izod impact was 0.48 lb. per inch of notch.

The tire cord employed in the foregoing examples and in Example 7 was from commercial used tires, of which the nylon content was from 85% to 100% nylon 6-6.

Comparative properties of the products of molding pellets of a commercial virgin nylon 6-6, and the pellets of Example 1 and of Examples 2, 3, 4, 5, and 6 are set forth in Table 1 (Van Dorn press) and in Table 2 (higher pressure press), respectively:

TABLE 1

|  | Example 1 | Virgin nylon 6-6 |
|---|---|---|
| Nylon in Pellet (dry basis), percent | 79.9 | 100 |
| Stiffness, as molded, p.s.i | 303,000 | 269,000 |
| Stiffness at 2½% moisture, p.s.i | 123,000 | 100,000 |
| Tensile, as molded, p.s.i | 6,287 | 9,100 |
| Tensile at 2½% moisture, p.s.i | 4,470 | 8,700 |
| Izod impact, as molded, ft.-lbs./in. of notch | 0.57 | |
| Izod impact at 2½% moisture, ft.-lbs./in. of notch | 0.33 | 1.0 |
| Tensile after 21 days at 251° F., p.s.i | 5,480 | 6,090 |
| Izod impact after 21 days at 250° F., ft.-lbs./in. of notch | 0.51 | 0.50 |
| Heat deflection temp. at— | | |
| 264 p.s.i., ° F | 221 | 170 |
| 66 p.s.i., ° F | 415 | 375 | recovered from tires contained rubber 12.8%, cellulosic materials 6.5%, and nylon 80.5%, dry basis, whereas the scrap nylon fibers contained about 100% nylon (6-6), dry basis. They were chopped with ³⁄₁₆" round holes in the screens. The chopped material was then pelleted in a pelleting machine (as above) giving dense pellets of the following analysis, dry basis—nylon 90.3, rubber 6.4, and cellulosic material 3.3. Nylon 6 scrap may be substituted for all or part of the nylon 6-6 scrap for certain purposes.

The analysis of the rubber which clung to the tire cord fiber used in the foregoing examples was sulfur-vulcanized rubber as follows:

| | Percent |
|---|---|
| Plasticizing oils | 13.0 |
| Ash | 5.4 |
| Carbon | 24.2 |
| Sulfur | 2½ to 3 |
| Total rubber hydrocarbon | 54.4 |
| Natural rubber | 45.0 |
| SBR (Buna S—a synthetic rubber formed from about 75% butadiene and 25% styrene) | 9.4 |

The term "pellets" and the like as used herein is intended to include compacted particles of any of a variety of shapes.

Proportions given herein are by weight unless otherwise specified.

Since certain changes in carrying out the above process and certain modifications in the composition which embody the invention may be made without departing from the scope, it is intended that all matter contained in the description shall be interpreted as illustrative and not in a limiting sense.

I claim:
1. A compacted molding composition in the form of pellets and containing from 64 to 91% of linear polyamide material and from 3% to 36% of rubbery hydrocarbon elastomeric material as a binder and having when molded a Shore D hardness of 70–80 points, a heat distortion at 264 pounds per square inch fiber stress of 192–221° F. and at 66 pounds per square inch fiber

TABLE 2

| Example Number | 2 | 3 | 4 | 5 | 6 | Virgin nylon 6-6 |
|---|---|---|---|---|---|---|
| Nylon in pellet (dry basis), percent | 64.6 | 80.5 | 83.3 | 84.6 | 85.6 | 100.0 |
| Cellulosic material, percent | 6.4 | 6.0 | 3.8 | 4.5 | 3.7 | None |
| Rubber, percent | 28.7 | 13.3 | 12.7 | 10.7 | 10.5 | None |
| Pellet density | | 1.098 | 1.112 | 1.110 | 1.100 | |
| Hardness Shore D | 71 | 78 | 78 | 79 | 80 | 84 |
| Rockwell Hardness 60 kg., ½ϕ indentor Indent.: | | | | | | |
| Recovery | | | | | 76.4 | 63.9 |
| Recovered | | | | | 14.0 | 12.6 |
| | | | | | 62.4 | 51.3 |
| Heat distortion temp. at— | | | | | | |
| 264 p.s.i., ° F | 192 | 212 | 198 | 205 | 210 | 175 |
| 66 p.s.i., ° F | 408 | 405 | 403 | 431 | 430 | 375 |
| Stiffness as molded, p.s.i | 230,000 | 317,000 | 277,000 | 313,000 | 294,000 | 269,000 |
| Stiffness after 25 days immersion, p.s.i | | 119,000 | 107,000 | 112,000 | 105,000 | 104,000 |
| Moisture content after 25 days immersion, percent | | 3.1 | 3.0 | 3.1 | 3.1 | 3.7 |
| Tensile as molded, p.s.i | 4,086 | 6,413 | 5,917 | 7,333 | 7,443 | 10,112 |
| Izod impact, ft.-lbs/in. of notch | 0.34 | 0.36 | 0.34 | 0.47 | 0.61 | 0.92 |
| Tensile after 28 days at 250° F., p.s.i | 2,862 | 3,370 | 2,970 | 3,900 | 4,190 | 3,177 |
| Izod impact, ft.-lbs/in of notch after 28 days | 0.36 | 0.39 | 0.30 | 0.43 | 0.48 | 0.50 |
| 2.5% moisture: | | | | | | |
| Tensile, p.s.i | 2,533 | 5,225 | 4,182 | 5,805 | 5,740 | 9,972 |
| Izod impact, ft.-lbs./in. of notch | 0.48 | 0.46 | 0.33 | 0.48 | 0.62 | 0.71 |

Example 7

100 parts of recovered nylon tire cord remaining after removal of rubber from automotive tires for a rubber reclaiming operation were chopped together with 100 parts clean scrap nylon fibers. The 100 parts nylon tire cord stress of 403–431° F., a stiffness of 230,000–317,000 pounds per square inch, a tensile strength of 4086–7443 pounds per square inch, and an Izod impact of 0.34–0.61 foot pounds per inch of notch said molding composition containing no additional binder other than said elastomeric material.

2. A molding composition as in claim 1 wherein the rubbery material content is kept within a 4 to 16% range by the addition of linear polyamide material which is substantially free from rubbery material.

References Cited

UNITED STATES PATENTS

| | | | |
|---|---|---|---|
| 2,809,944 | 10/1957 | Sverdrup | 260—2.3 |
| 3,027,599 | 4/1962 | Pluhacek et al. | 260—2.3 XR |

FOREIGN PATENTS

| | | |
|---|---|---|
| 722,752 | 11/1965 | Canada. |
| 866,479 | 4/1961 | Great Britain. |

MURRAY TILLMAN, Primary Examiner

K. E. KUFFNER, Assistant Examiner

U.S. Cl. X.R.

260—3, 2.3